Dec. 22, 1964     R. A. MacDONALD ETAL     3,162,050
SAMPLE VALVE
Filed Nov. 9, 1962
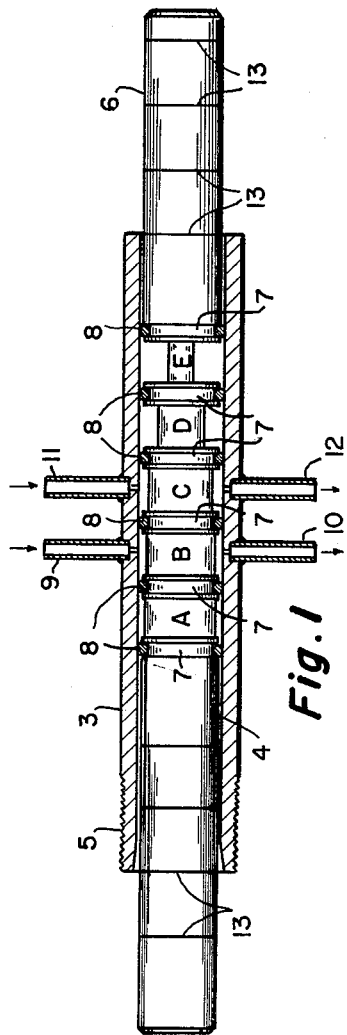
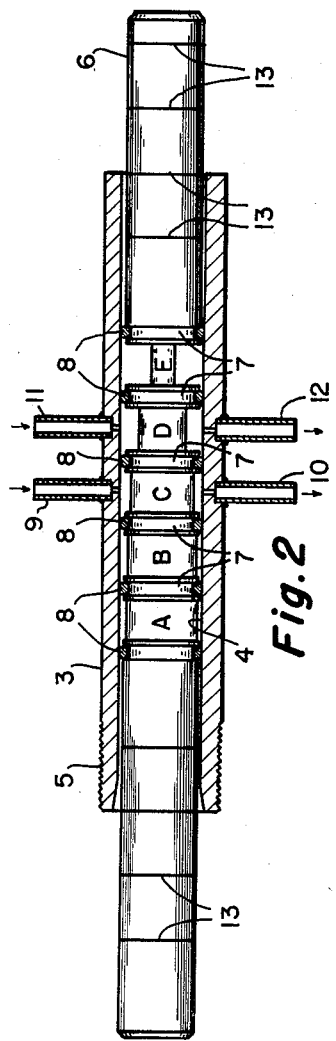
INVENTORS
Ronald A. MacDonald
Patrick M. Handke
BY
*Webb Mackey & Burden*
THEIR ATTORNEYS 3,162,050
SAMPLE VALVE
Ronald A. MacDonald and Patrick M. Handke, Pittsburgh, Pa., assignors to Fisher Scientific Company, Pittsburgh, Pa.
Filed Nov. 9, 1962, Ser. No. 236,634
1 Claim. (Cl. 73—422)

This application relates to a sample valve, more particularly a valve for supplying samples of gas to gas chromatographic apparatus for analysis in that apparatus.

In carrying out analyses by gas chromatography, a stream of inert carrier gas is caused to flow through one or more chromatographic columns and through detector cells positioned at the exit end of each column. A sample of the mixture to be analyzed is injected into the carrier stream in advance of the first column and carried through the columns and cells. As the sample passes through the column or columns, the mixture is separated into its several components, which components elute one at a time from a column and are detected by a detector cell which in turn sends a signal to a reading or recording device.

In order to obtain accurate results in the analysis, it is important that the flow of inert carrier gas be continuous while a sample of the gas to be analyzed is supplied to the carrier gas stream and also that samples of uniform volume be supplied to the stream. To accomplish this, it has been the practice to flow gas to be analyzed through a short loop of tubing and then, by means of a multi-ported valve, to connect the loop with sample gas flowing through it into the line through which carrier gas is flowing. The carrier gas then flows through the sample loop, displaces the sample in the loop and carries it to the first chromatographic column.

The practice just described has certain inherent defects, which affect the accuracy of the analyses which are made. Thus, the volume of the samples is affected by dead space in the fixtures and lead-ins whereby the sample loop and the multi-ported valve are connected to each other and to the piping for the carrier gas. Also, in order to obtain samples of different volume, it is necessary to use different loops and inaccuracies arise when the loops are removed and replaced. It is difficult to determine the actual sample volume supplied to the carrier stream and the minimum volume is limited by the necessary physical dimensions of the shortest sample loop. The sample loops must be placed in an accessible position so that they can be replaced, and in such a position they present a large surface area, as a result of which the sample loops and the sample gas within the loop are affected by ambient temperatures. Finally, use of the conventional gas sampling valve requires that at least six pressure connections be made.

The sampling valve which we have invented overcomes these difficulties because the sample volumes which are to be connected into the stream of carrier gas are contained within the valve itself.

Our sampling valve comprises a cylindrical tube or barrel having a bore through which a plunger can be moved axially. Segments of the plunger have cross sectional areas less than the cross sectional area of the bore of the barrel and are sealed from each other to form sealed enclosures providing sample volumes of different sizes. The plunger is moved axially within the barrel to bring the individual sample volumes in communication with conduits carried by the barrel which conduits are connected into the gas sample line and the carrier gas line.

In the accompanying drawings, we have illustrated a presently preferred embodiment of our invention in which:

FIGURE 1 is a longitudinal section of the valve showing the plunger in one operative position in the barrel; and FIGURE 2 is a longitudinal section of the valve showing the plunger in another operative position within the barrel.

Referring to the drawings, our sample valve includes a barrel 3 having a uniform bore 4 and threaded at one end 5 for mounting purposes. A plunger 6 extends through the bore 4 and its diameter is such that it makes a sliding fit with the bore so that it is axially movable within the bore. As shown in the drawings, the plunger is longer than the barrel so that it projects from an end of the barrel and the projecting end is used to move the plunger.

Segments of the plunger within the barrel have varying diameters, all of which are less than the diameter of the bore 4. In the drawings, these segments have been lettered, A, B, C, D and E, respectively. The segments are spaced from each other along the length of the plunger, and the portions of the plunger which are between these segments and also the portions of the plunger which are at the outer ends of the segments closest to the ends of the plunger (segments A and E) have grooves 7 which provides seats for O-rings 8. The seals 8 engage the surface of the bore 4 and with the segments of reduced diameter form a series of sealed enclosures which constitute sample volumes of different sizes.

The barrel 3 carries two pairs of conduits, conduits 9 and 10 constituting one pair, and condiuts 11 and 12 constituting the second pair. All of these conduits communicate with the bore 4 and with the individual enclosures or sample volumes. The conduits 9 and 10 provide a carrier gas inlet and a carrier gas outlet, respectively, and the conduits 11 and 12 provide a sample gas inlet and a sample gas outlet, respectively.

There is one more sealed enclosure than the number of sample volumes used. It is used to provide for the flow of carrier gas through the system when the segment next to it is used as a sample volume. It is always placed towards the end of the plunger which is nearest to the conduits for the carrier gas.

To use the sample valve, the conduits 9 and 10 are connected into the carrier gas line of a chromatographic system, and the conduits 11 and 12 are connected to a source of the gas to be analyzed. The plunger is positioned so that one volume (that formed by segment B) is in line with the conduits 9 and 10, and another sealed enclosure (that formed by the segment C) is in line with the conduits 11 and 12, and the supply of both gases is turned on. To inject a gas sample to be analyzed into the carrier stream, the plunger 6 is then moved from the position shown in FIGURE 1 to the position shown in FIGURE 2, in which the volume formed by the segment C is brought in line with the conduits 9 and 10. The carrier stream displaces the sample within the volume C and carries the sample volume to the chromatographic columns. This process can be repeated by returning the plunger 6 to the position shown in FIGURE 1.

To enable an operator to properly position the plunger 6 so as to line up sample volumes with the conduits, we provide position marks 13 on the ends of the plunger which extend beyond the ends of the barrel.

In the drawings, the conduits 9 and 10 are shown as being in line with each other, and likewise, the second pair of conduits 11 and 12 are shown as being in line with each other. However, it is not necessary that the conduits be so positioned on the barrel 3. It is only necessary that the two conduits of each pair be positioned so that they both communicate with the same enclosure formed by the reduced diameter of a segment of the plunger. The two conduits of a pair of conduits thus must be spaced relative to each other along the length of the barrel a distance less than the axial length of the segments of reduced diameter. The two conduits forming a pair of conduits can be at any angular position relative to each other around the barrel 3, but it is preferable that they be on opposite sides of the barrel so as to insure flushing and complete filling of the sample volumes. The two pairs of conduits also must be spaced from each other so that the conduit of one pair which is closest to a conduit of the other pair is spaced from that conduit a distance greater than the length of the portions of the plunger which are between the segments of reduced diameter.

A typical sample valve may have a series of sealed enclosures providing sample volumes as follows (referring to the sample volumes formed by the segments labeled B, C, D and E in the drawings):

B _____ 0.2 ml.  D _____ 1.0 ml.
C _____ 0.5      E _____ 1.5

To obtain these volumes, the diameter of the bore 4 of the barrel is .613 inch. The diameter of the plunger is .594 inch, and the diameters of the segments are as follows:

B _____ .576 inch  D _____ .387 inch
C _____ .512       E _____ .184

From the foregoing, it is apparent that our sampling valve overcomes the difficulties which have heretofore been encountered with sampling valves using sample loops. The sample volumes are contained within the valve and therefore are less susceptible to ambient temperatures. Loops do not have to be removed and replaced, thus avoiding problems with pressure connections. There is little difficulty in determining accurately the actual sample volume which is supplied to a carrier gas stream nor with reproducing this volume, and the minimum sample volume is limited only by the machining facilities which are used to make the valves. There is no dead space created by fixtures and lead-ins, and once the required pressure connections are made, they are not disturbed. A variety of sample volumes can be supplied to a carrier stream. One plunger can easily provide one or more sample volumes and other plungers with other sample volumes can be inserted into the barrel at will.

While we have described a presently preferred embodiment of our invention, it is to be understood that it may be otherwise variously embodied within the scope of the appended claims.

We claim:
A sample valve comprising,

A. a barrel having an internal bore extending the length of the barrel,
B. a plunger movable axially within said bore,
C. at least two segments of the plunger
    (1) spaced from each other along the length of the plunger,
    (2) having cross sectional areas less than the cross sectional area of the bore, and differing in amount from each other,
D. seals
    (1) mounted on the portions of the plunger between said segments and at the outer ends of the segments closest to the ends of the plunger, and
    (2) engaging the surface of the barrel bore to form at least two sealed enclosures
E. a first pair of conduits
    (1) leading into the interior of the barrel and
    (2) spaced from each other along the length of the barrel a distance less than the axial length of the said segments, and
F. a second pair of conduits
    (1) leading into the interior of the barrel and
    (2) spaced from each other along the length of the barrel a distance less than the axial length of said segments of reduced cross section,
G. the conduits of each pair which are closest to a conduit in the other pair being spaced from each other along the barrel a distance at least equal to the length of the portions of the plunger between said segments,
H. said plunger being movable axially within the bore of said barrel to bring one of said sealed enclosures in communication with said first pair of conduits and another sealed enclosure in communication with said second pair of conduits.

References Cited in the file of this patent
UNITED STATES PATENTS

| | | |
|---|---|---|
| 1,182,878 | Standley | May 9, 1916 |
| 2,757,541 | Watson | Aug. 7, 1956 |
| 3,100,984 | Martin | Aug. 20, 1963 |

FOREIGN PATENTS

| | | |
|---|---|---|
| 1,182,564 | France | Jan. 19, 1959 |
| 1,128,179 | Germany | Apr. 19, 1962 |